(12) United States Patent
Pelouch

(10) Patent No.: US 10,707,638 B2
(45) Date of Patent: Jul. 7, 2020

(54) INTEGRATED SIGNAL LOSS DETECTION IN RAMAN AMPLIFIED FIBER SPANS OR OTHER FIBER SPANS

(71) Applicant: Neptune Subsea IP Limited, London (GB)

(72) Inventor: Wayne S. Pelouch, McKinney, TX (US)

(73) Assignee: Neptune Subsea IP Limited, London (GB)

( * ) Notice: Subject to any disclaimer, the term of this patent is extended or adjusted under 35 U.S.C. 154(b) by 288 days.

(21) Appl. No.: 15/810,387

(22) Filed: Nov. 13, 2017

(65) Prior Publication Data

US 2019/0148902 A1     May 16, 2019

(51) Int. Cl.
| | |
|---|---|
| *H01S 3/00* | (2006.01) |
| *H04B 10/291* | (2013.01) |
| *H04B 10/2537* | (2013.01) |
| *H04B 10/077* | (2013.01) |
| *G02B 6/35* | (2006.01) |
| *H01S 3/094* | (2006.01) |
| *H01S 3/30* | (2006.01) |

(52) U.S. Cl.
CPC .............. *H01S 3/0014* (2013.01); *G02B 6/35* (2013.01); *H01S 3/094003* (2013.01); *H01S 3/094053* (2013.01); *H01S 3/302* (2013.01); *H04B 10/077* (2013.01); *H04B 10/2537* (2013.01); *H04B 10/2916* (2013.01)

(58) Field of Classification Search
CPC ... G02B 6/35; H01S 3/0014; H01S 3/094003; H01S 3/094053; H01S 3/302

USPC ........................................................ 359/334
See application file for complete search history.

(56) References Cited

U.S. PATENT DOCUMENTS

| | | | |
|---|---|---|---|
| 5,914,794 | A | 6/1999 | Fee et al. |
| 6,008,915 | A | 12/1999 | Zyskind |
| 6,115,154 | A | 9/2000 | Antoniades et al. |
| 6,222,668 | B1 | 4/2001 | Dutrisac et al. |
| 6,681,079 | B1 | 1/2004 | Maroney |
| 6,807,001 | B1 | 10/2004 | Ranka et al. |
| 7,031,049 | B2 | 4/2006 | Kamada et al. |
| 7,218,442 | B2 | 5/2007 | Akbaba et al. |
| 10,009,671 | B2 * | 6/2018 | Younce ............ H04Q 11/0066 |

(Continued)

FOREIGN PATENT DOCUMENTS

EP          1916565 A1      4/2008

OTHER PUBLICATIONS

International Search Report and Written Opinion of the International Searching Authority for International Patent Application No. PCT/GB2018/053270 dated Feb. 18, 2019, 14 pages.

*Primary Examiner* — Mark Hellner

(57) ABSTRACT

An apparatus includes multiple ports configured to be coupled to multiple optical fibers and to transmit first optical signals and receive second optical signals over the optical fibers. The apparatus also includes a signal source configured to generate a first additional optical signal for inclusion with the first optical signals. The apparatus further includes a signal detector configured to detect a second additional optical signal included with the second optical signals. In addition, the apparatus includes a switch configured to selectively couple the signal source to one of the ports. The switch is configured to couple the signal source to different ones of the ports in different configurations of the switch.

20 Claims, 5 Drawing Sheets

(56) References Cited

U.S. PATENT DOCUMENTS

| | | | |
|---|---|---|---|
| 2004/0047628 A1 | 3/2004 | Passier et al. | |
| 2004/0213567 A1* | 10/2004 | Deguchi | H04B 10/03 398/32 |
| 2006/0119931 A1 | 6/2006 | Ghera et al. | |
| 2010/0183305 A1* | 7/2010 | Chang | H01S 3/06758 398/67 |
| 2010/0260212 A1 | 10/2010 | Mimuro et al. | |
| 2015/0208146 A1 | 7/2015 | Younce et al. | |
| 2015/0253217 A1* | 9/2015 | Gurusami | G01M 11/3127 356/73.1 |

\* cited by examiner

INTEGRATED SIGNAL LOSS DETECTION IN RAMAN AMPLIFIED FIBER SPANS OR OTHER FIBER SPANS

TECHNICAL FIELD

This disclosure relates generally to optical communication systems. More specifically, this disclosure relates to integrated signal loss detection in Raman amplified fiber spans or other fiber spans.

BACKGROUND

Optical communication networks are often used to transport large amounts of data over long distances very quickly. At present, sophisticated optical communication networks are capable of transmitting tens of trillions of bits of information per second over a single optical fiber spanning many hundreds of kilometers. Optical communication networks generally exceed the bandwidth capabilities of copper networks. As a result, optical networks are often used to form undersea telecommunication networks and to form optical backbones in wireline telecommunication networks.

Optical communication networks can use lasers to pump optical amplifiers and to generate optical signals that are transported through the networks and through the amplifiers. For safety and other reasons, it is often necessary or desirable to detect a loss of signal (LOS) condition over an optical network communication link, which could be indicative of a cable break or other fault. Upon the detection of an LOS condition, the laser or lasers being used to communicate over that communication link can be shut down as part of an automatic laser shutdown (ALS) process. This can help to reduce or prevent injury to people and damage to equipment.

Unfortunately, conventional LOS detection techniques fall short in various ways. In some conventional approaches, a Raman amplifier module provides pump power that is multiplexed with optical signals onto a signal fiber, and a signal monitor attempts to detect a loss of signal power from the amplifier module over the signal fiber. However, amplified spontaneous emissions (ASE) generated by the amplifier module's pumps travel in the same direction as the optical signals and can be quite powerful. This makes detecting an LOS condition difficult or impossible in some cases.

In other conventional approaches, a residual pump monitor can measure the amount of residual pump power that is received over a signal fiber from a Raman amplifier module. However, in some cases, the amplifier module might not provide enough pump power into the signal fiber so that residual power is received by the residual pump monitor, or backscatter created by pumps within the amplifier module could be much higher than any residual pump power. Moreover, some conventional optical spans include remote optically pumped amplifiers (ROPAs), and isolators in the ROPAs can block residual pump power. Additionally, rare-earth doped fibers in the ROPAs may absorb the pump power. These factors can prevent the residual pump monitor from detecting an LOS condition.

SUMMARY

This disclosure provides integrated signal loss detection in Raman amplified fiber spans or other fiber spans.

In a first embodiment, an apparatus includes multiple ports configured to be coupled to multiple optical fibers and to transmit first optical signals and receive second optical signals over the optical fibers. The apparatus also includes a signal source configured to generate a first additional optical signal for inclusion with the first optical signals. The apparatus further includes a signal detector configured to detect a second additional optical signal included with the second optical signals. In addition, the apparatus includes a switch configured to selectively couple the signal source to one of the ports. The switch is configured to couple the signal source to different ones of the ports in different configurations of the switch.

Any of the following features, individually or in any combination, could be used with the apparatus of the first embodiment. The apparatus could include at least one pump configured to generate Raman pump power and at least one multiplexer configured to inject the Raman pump power onto a first of the optical fibers coupled to a first of the ports. The different configurations of the switch could be based on whether the Raman pump power is used for forward or backward Raman amplification. The apparatus could include a first filter coupled to a first of the ports, a second of the ports, the signal detector, and the switch and a second filter coupled to a third of the ports, a fourth of the ports, and the switch. Each filter could be configured to filter the first or second optical signals and to output a specified range of wavelengths, where the specified range of wavelengths includes a wavelength of the first or second additional optical signal. The apparatus could include an optical coupler or circulator configured to couple the signal source and the signal detector to the first filter. The apparatus could include the optical coupler, and the switch could include a 2×2 switch that, in one configuration, is configured to recycle power from the optical coupler into the signal detector. The first and second additional optical signals could be outside a signal band of wavelengths used by the first and second optical signals. The first and second additional optical signals could be modulated.

In a second embodiment, a system includes an optical span having a first module configured to communicate optically with a second module. The first module includes multiple ports configured to be coupled to multiple optical fibers. At least one of the ports is configured to transmit first optical signals to the second module and/or receive second optical signals from the second module. The first module also includes a signal source configured to generate a first additional optical signal for inclusion with the first optical signals. The first module further includes a signal detector configured to detect a second additional optical signal included with the second optical signals. In addition, the first module includes a switch configured to selectively couple the signal source to one of the ports, where the switch is configured to couple the signal source to different ones of the ports in different configurations of the switch.

Any of the following features, individually or in any combination, could be used with the system of the second embodiment. The first module could include at least one pump configured to generate Raman pump power and at least one multiplexer configured to inject the Raman pump power onto a first of the optical fibers coupled to a first of the ports. The different configurations of the switch could be based on whether the Raman pump power is used for forward or backward Raman amplification. The first module could include a first filter coupled to a first of the ports, a second of the ports, the signal detector, and the switch and a second filter coupled to a third of the ports, a fourth of the ports, and the switch. Each filter could be configured to filter the first or second optical signals and to output a specified range of wavelengths, where the specified range of wavelengths includes a wavelength of the first or second additional optical signal. The first module could include an optical coupler or circulator configured to couple the signal source and the signal detector to the first filter. The first module could include the optical coupler, and the switch could include a 2×2 switch that, in one configuration, is configured to recycle power from the optical coupler into the signal detector.

In a third embodiment, an apparatus includes first, second, third, and fourth ports configured to be coupled to multiple optical fibers. The apparatus also includes a first signal line communicatively coupling the first and second ports and a second signal line communicatively coupling the third and fourth ports. The apparatus further includes a signal source configured to generate a first loss of signal (LOS) optical signal for transmission through the third port. The apparatus also includes a signal detector configured to detect a second LOS optical signal received through the first port. In addition, the apparatus includes a switch configured to selectively couple the signal source to the first port or the third port, where the switch is configured to couple the signal source to different ones of the ports in different configurations of the switch.

Any of the following features, individually or in any combination, could be used with the apparatus of the third embodiment. The apparatus could include at least one pump configured to generate Raman pump power and at least one multiplexer configured to inject the Raman pump power through the first port. The apparatus could include a first filter coupled to the first signal line, the signal detector, and the switch and a second filter coupled to the second signal line and the switch. Each filter could be configured to filter optical signals and to output a specified range of wavelengths, where the specified range of wavelengths includes a wavelength of the first or second LOS optical signal. The apparatus could include an optical coupler or circulator configured to couple the signal source and the signal detector to the first filter. The apparatus could include the optical coupler, and the switch could include a 2×2 switch that, in one configuration, is configured to recycle power from the optical coupler into the signal detector. The 2×2 switch could be further configured, in another configuration, to couple the signal source to the optical coupler.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure provides various architectures for loss of signal (LOS) detectors, which can be used in Raman amplified fiber spans or other fiber spans of optical communication networks. As described in more detail below, each of the LOS detectors includes a signal source that provides an outgoing low-power signal and a signal detector that detects an incoming low-power signal. Depending on the configuration, each LOS detector can (i) transmit the outgoing low-power signal from its signal source over a signal fiber to the signal detector of another LOS detector and/or (ii) receive the incoming low-power signal from another LOS detector over the signal fiber and detect/measure the incoming low-power signal using its signal detector.

This allows the LOS detectors to be easily reconfigured depending on their application. For instance, the LOS detectors can be easily reconfigured based on whether the LOS detectors are being used with forward or backward Raman amplification modules. Moreover, the LOS detectors can be integrated into Raman assemblies or other assemblies, thereby allowing the assemblies to quickly detect LOS conditions and to deactivate lasers or take other suitable actions. Further, outgoing low-power signals can be modulated to improve detection sensitivity and to reduce transmit power so that they do not alter the signal power profile in a signal fiber. In addition, since the LOS detectors can be easily reconfigured, the LOS detectors can be used in a wide variety of environments, including environments using any combination of Raman pumping and unrepeatered spans and environments using remote optically pumped amplifiers (ROPAs).

Figure 1:
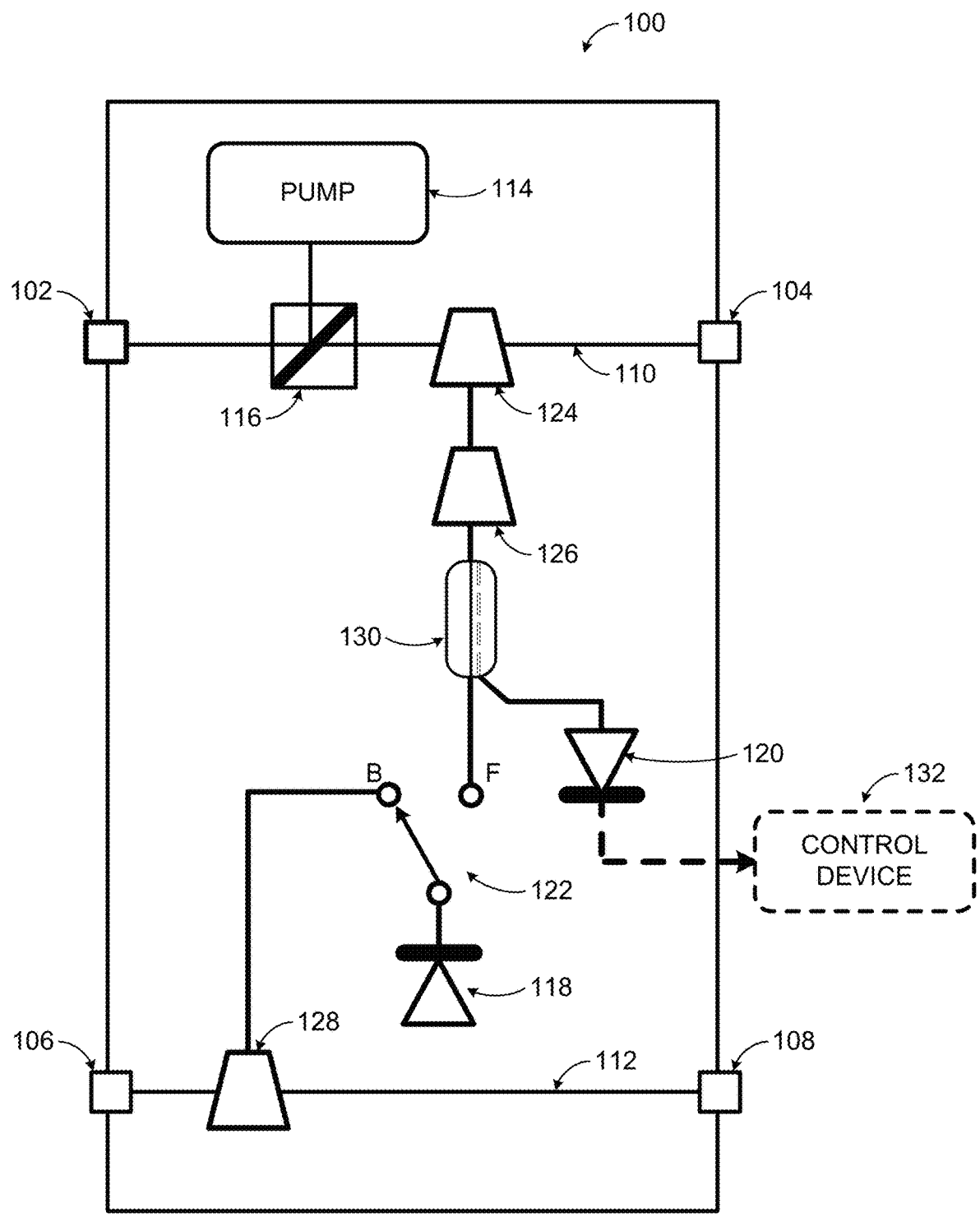
FIG. 1 illustrates a first example of a module having an integrated signal loss detector according to this disclosure.

FIG. 1 illustrates a first example of a module 100 having an integrated signal loss detector according to this disclosure. As shown in FIG. 1, the module 100 includes multiple input/output (I/O) ports 102-108. The ports 102-108 represent structures that are configured to be coupled to optical fibers and to enable the input or output of optical signals using those optical fibers. In this example, the ports 102-104 are coupled by a signal line 110, allowing optical signals that are received via one of the ports 102-104 to be passed to and transmitted through another of the ports 102-104. Similarly, the ports 106-108 are coupled by a signal line 112, allowing optical signals that are received via one of the ports 106-108 to be passed to and transmitted through another of the ports 106-108. Each port 102-108 includes any suitable structure configured to be coupled to at least one optical fiber. Each signal line 110-112 represents any suitable structure configured to transport optical signals, such as an optical fiber.

The module 100 also includes at least one pump 114, which is optically coupled to the signal line 110 via a multiplexer 116. Each pump 114 generates optical pump power that is injected into the optical fiber coupled to the port 102, which allows Raman amplification to occur within the optical fiber coupled to the port 102. A single pump 114 could be used to generate pump power at one or more wavelengths, or a collection of pumps 114 could be used to generate pump power at one or more wavelengths. As a particular example, one or more pumps 114 could be used to generate pump power between 1420 nm and 1500 nm, although any other suitable wavelengths or wavelength ranges could be used. Each pump 114 includes any suitable structure configured to generate optical power, such as one or more lasers.

The multiplexer 116 allows the optical pump power from the pump(s) 114 to be injected into the optical fiber coupled to the port 102. The pump power can therefore be multiplexed onto a signal fiber that also carries optical signals used for communication of data between locations. The optical pump power can be provided so that Raman amplification occurs within the signal fiber and amplifies the optical signals used for data communication. The multiplexer 116 includes any suitable structure configured to multiplex optical signals and pump power onto a common optical medium or media.

A loss of signal detector is implemented within the module 100 using a signal source 118 and a signal detector 120. The signal source 118 generally operates to produce a first low-power optical signal that is used by another module 100 for LOS detection, and the signal detector 120 generally operates to detect a second low-power optical signal from another module 100 for LOS detection. For example, as described in more detail below, the signal source 118 of a first module 100 can generate a first low-power optical signal that is transported over a first optical fiber, and the signal detector 120 of a second module 100 can detect whether the first low-power optical signal is received. Similarly, the signal source 118 of the second module 100 can generate a second low-power optical signal that is transported over a second optical fiber, and the signal detector 120 of the first module 100 can detect whether the second low-power optical signal is received. The absence of either low-power signal can be indicative of a cable break or other fault.

The low-power optical signal generated by the signal source 118 or detected by the signal detector 120 can represent an optical signal that is outside the wavelength(s) or wavelength range(s) used by optical signals carrying information over optical fibers. As a result, the presence of the low-power optical signal on an optical fiber would not interfere with optical signals carrying data over the optical fiber. Thus, LOS detection can occur simultaneously with the transport of data over the optical fiber, and there is little or no need to stop the transmission of data-carrying optical signals over the optical fiber in order to perform LOS detection. Moreover, the low-power optical signal generated by the signal source 118 can be modulated. The modulation can help to improve the detection sensitivity in the receiving module 100. The modulation can also help to reduce the amount of transmit power used by the signal source 118, so the presence of the low-power optical signal from the signal source 118 on an optical fiber would not significantly alter the signal power profile in the optical fiber. Any suitable modulation scheme can be used by the signal source 118. In some embodiments, the signal source 118 could modulate the low-power optical signal at a frequency of about 1 kHz.

The signal source 118 includes any suitable structure configured to generate an optical signal used for LOS detection. In some embodiments, the signal source 118 includes at least one laser diode, such as a distributed feedback (DFB) laser diode. In particular embodiments, the laser diode could generate a −10 dBm output at a wavelength of about 1525 nm or about 1612 nm. The low-power optical signal can be outside the normal signal band of wavelengths used for optical signals carrying data. The signal detector 120 includes any suitable structure configured to detect or measure an optical signal used for LOS detection. In some embodiments, the signal detector 120 includes at least one photodiode or other photodetector.

Because the module 100 could be used in various environments (including with forward and backward Raman amplification modules), the module 100 includes a switch 122 that controls where the output of the signal source 118 is provided. In this example, the switch 122 represents a 1×2 switch having one input and two outputs labeled "F" (forward) and "B" (backward). In the forward position, the output of the signal source 118 can be provided to the signal line 110 for transport through the port 102. In the backward position, the output of the signal source 118 can be provided to the signal line 112 for transport through the port 106. This allows the module 100 to be used in a number of environments and to be easily reconfigured based on the intended application. The switch 122 includes any suitable structure configured to selectively create optical communication pathways.

Filters 124-128 are used at various locations within the module 100. For example, a filter 124 can be used to remove shorter wavelengths from optical signals. Filters 126 and 128 can be used to remove wavelengths that are not at or near the wavelength of the optical signal produced by the signal source 118 of the module 100 or another module 100. The output of the filter 126 or 128 could represent a narrow range of wavelengths around the wavelength of the optical signal produced by the signal source 118 of the module 100 or the other module 100. As a particular example, the output of the filter 126 or 128 could represent a narrow range of wavelengths around 1525 nm or 1612 nm. Each filter 124-128 includes any suitable structure for filtering optical signals. In particular embodiments, each of the filters 124-128 could represent an optical passband filter that is used to reject amplified spontaneous emissions (ASE) and to improve the sensitivity of the LOS detector. Note that while two separate filters 124 and 126 are shown here, a single filter could also be used to provide a narrow range of wavelengths. For example, the filter 124 could provide both the function of separating the wavelengths at or near the wavelength of the signal source 118 from other wavelengths on the signal line 110 and the function of a narrow-band filter to minimize unwanted optical power from being detected by the signal detector 120.

An optical coupler 130 is used in this example to allow the signal source 118 and the signal detector 120 to be coupled to the filter 126. For example, the optical coupler 130 can provide a first optical path between the signal source 118 and the filter 126 and a second optical path between the signal detector 120 and the filter 126. The optical coupler 130 includes any suitable structure for coupling optical pathways. In some embodiments, the optical coupler 130 could represent a 50% coupler.

The output of the signal detector 120 could be coupled to any suitable components that can use measurements from the signal detector 120 to perform various functions, such as one or more control devices 132. For example, the output of the signal detector 120 could be coupled to an analog-to-digital converter (ADC), which digitizes values provided by the signal detector 120. The digitized values could be filtered, amplified by a lock-in amplifier, and provided to a microprocessor, microcontroller, digital signal processor (DSP), field programmable gate array (FPGA), application specific integrated circuit (ASIC), or other devices for further processing. The control device 132 could use the values output by the signal detector 120 in order to perform synchronous detection, determine whether to initiate an automatic laser shutdown (ALS) process, or perform other actions.

Although FIG. 1 illustrates a first example of a module 100 having an integrated signal loss detector, various changes may be made to FIG. 1. For example, the module 100 shown in FIG. 1 has been simplified for ease of explanation and understanding. Modules used in Raman amplification and other applications can include a number of other components supporting other or additional functions in the modules. These details are not needed for an understanding of this disclosure. Also, while the use of the pump 114 and multiplexer 116 are shown here and described as supporting Raman amplification, other embodiments of the module 100 need not include components supporting Raman amplification. For instance, the signal detector 120 could be used to measure the absolute or relative power level of a signal received from the signal source 118 in another module 100 in order to measure the loss value or a change in the loss value of a fiber connected between the port 102 and the other module 100. It is also possible that the signal source 118 can be modulated in a manner to transmit information from one module 100 to another module 100. In addition, various other functions could occur using the components shown in FIG. 1. For instance, when the switch 122 is in the "forward" position, the signal source 118 could transmit signals via the port 102, and the signal detector 120 could receive reflected or back-scattered signals via the port 102 to support optical time-domain reflectometry (OTDR) operations.

Figure 2:
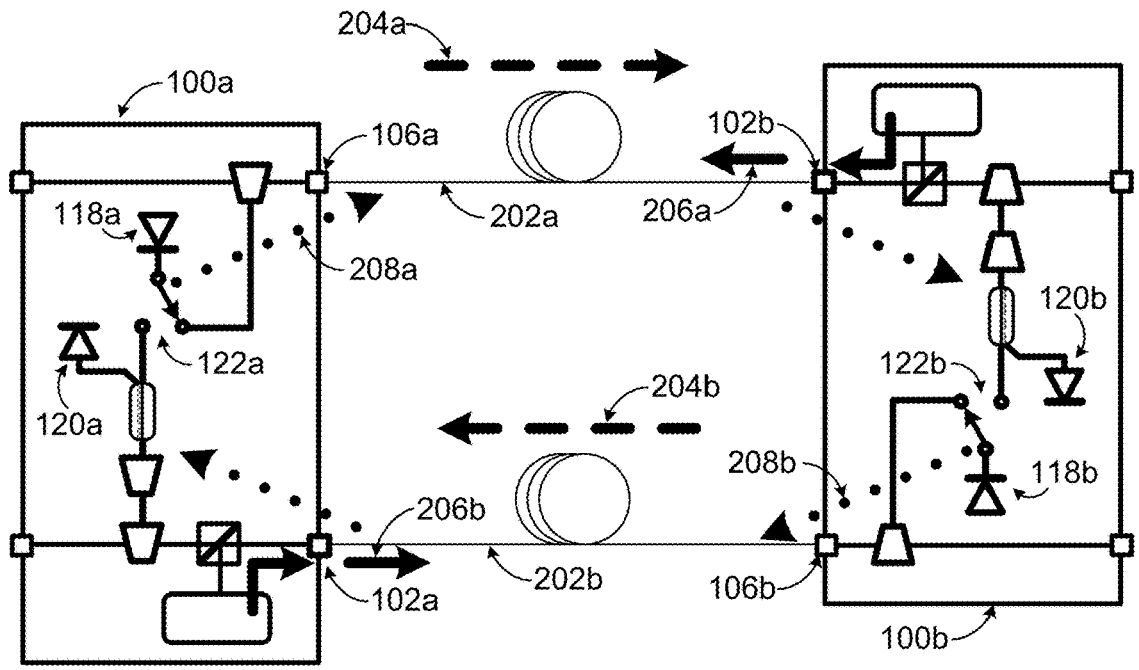
FIGS. 2 through 4 illustrate example uses of modules having integrated signal loss detectors according to this disclosure.
Figure 3:
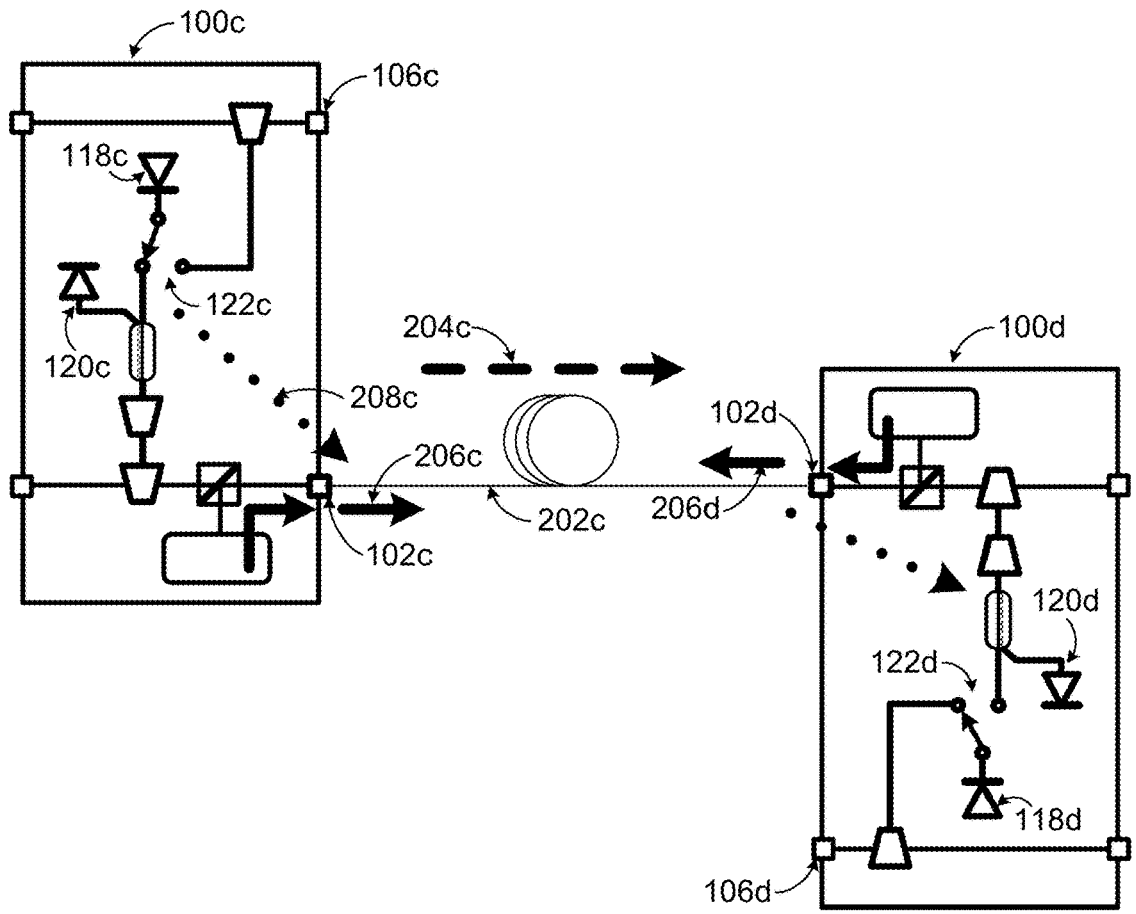
Figure 4:
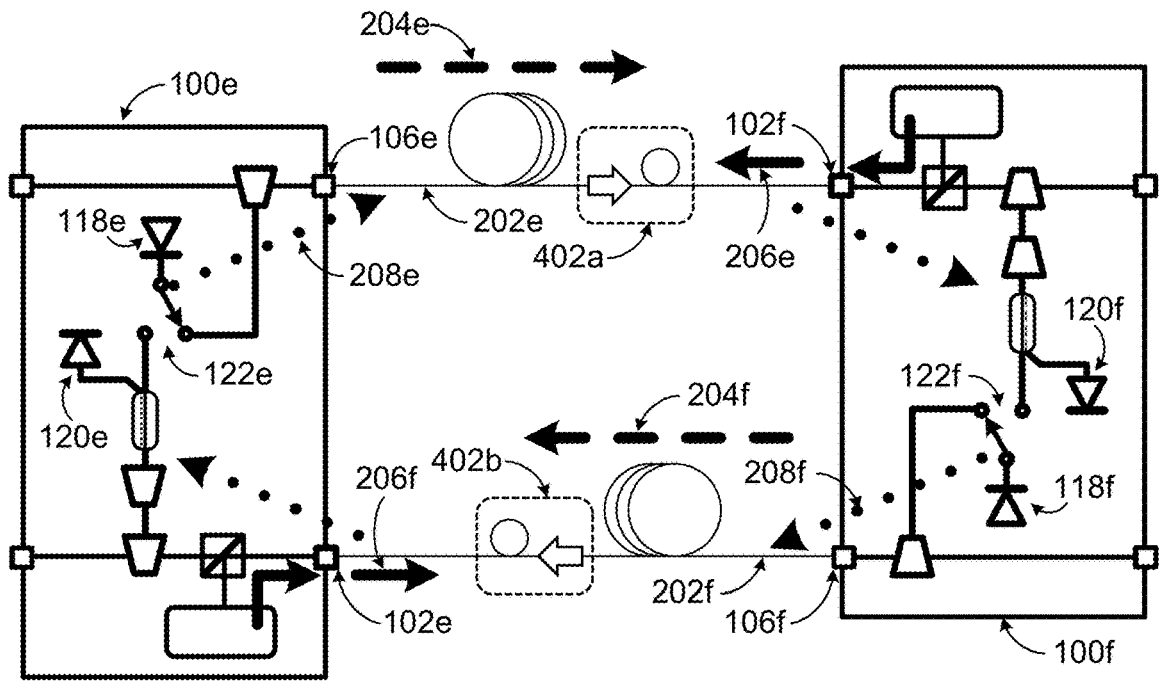

FIGS. 2 through 4 illustrate example uses of modules having integrated signal loss detectors according to this disclosure. In general, modules supporting Raman amplification are typically placed symmetrically around an optical span, so the example uses shown in FIGS. 2 through 4 include two modules (each implemented as shown in FIG. 1), one on each side of an optical span.

As shown in FIG. 2, two modules 100a-100b are being used to support backward Raman amplification over two optical fibers 202a-202b. In the optical fiber 202a, optical signals 204a are transported from the module 100a to the module 100b in one direction, and Raman pump power 206a is transported away from the module 100b toward the module 100a in the opposite direction. The Raman pump power 206a is used to create Raman amplification in at least part of the optical fiber 202a. Similarly, in the optical fiber 202b, optical signals 204b are transported from the module 100b to the module 100a in one direction, and Raman pump power 206b is transported away from the module 100a toward the module 100b in the opposite direction. The Raman pump power 206b is used to create Raman amplification in at least part of the optical fiber 202b. The optical signals 204a and 204b travel in opposite directions here, making this optical span a bi-directional span.

To support LOS detection in FIG. 2, switches 122a-122b of the modules 100a-100b are set to the "backward" position. In this configuration, the signal source 118a in the module 100a outputs a low-power optical signal 208a through the switch 122a and through the port 106a of the module 100a onto the optical fiber 202a. Absent a loss of signal condition, the low-power optical signal 208a will travel over the optical fiber 202a to the port 102b and the signal detector 120b of the module 100b. This allows the module 100b or components coupled to the module 100b to identify a loss of signal condition involving the optical fiber 202a by detecting a failure to receive the low-power optical signal 208a. Similarly, the signal source 118b in the module 100b outputs a low-power optical signal 208b through the switch 122b and through the port 106b of the module 100b onto the optical fiber 202b. Absent a loss of signal condition, the low-power optical signal 208b will travel over the optical fiber 202b to the port 102a and the signal detector 120a of the module 100a. This allows the module 100a or components coupled to the module 100a to identify a loss of signal condition involving the optical fiber 202b by detecting a failure to receive the low-power optical signal 208b.

As shown in FIG. 3, two modules 100c-100d are being used to support both forward and backward Raman amplification over an optical fiber 202c. In the optical fiber 202c, optical signals 204c are transported from the module 100c to the module 100d in one direction, Raman pump power 206c is transported from the module 100c toward the module 100d in the same direction, and Raman pump power 206d is transported from the module 100d toward the module 100c in the opposite direction. Each of the Raman pump power 206c and the Raman pump power 206d is used to create Raman amplification in at least part of the optical fiber 202c. Although not shown here, another set of modules 100 could be used with another optical fiber to support communication of optical signals in the opposite direction.

To support LOS detection in FIG. 3, switches 122c-122d of the modules 100c-100d are set to the "forward" position. In this configuration, the signal source 118c in the module 100c outputs a low-power optical signal 208c through the switch 122c and through the port 102c of the module 100c onto the optical fiber 202c. Absent a loss of signal condition, the low-power optical signal 208c will travel over the optical fiber 202c to the port 102d and the signal detector 120d of the module 100d. This allows the module 100d or components coupled to the module 100d to identify a loss of signal condition involving the optical fiber 202c by detecting a failure to receive the low-power optical signal 208c.

As shown in FIG. 4, two modules 100e-100f are being used to support backward Raman amplification over two optical fibers 202e-202f, and remote optically pumped amplifiers (ROPAs) 402a-402b are positioned along the optical fibers 202e-202f. In the optical fiber 202e, optical signals 204e are transported from the module 100e to the module 100f in one direction, and Raman pump power 206e is transported away from the module 100f toward the module 100e in the opposite direction. The Raman pump power 206e is used to create Raman amplification in at least part of the optical fiber 202e, and the ROPA 402a also amplifies the optical signals 204e in the optical fiber 202e. Similarly, in the optical fiber 202f, optical signals 204f are transported from the module 100f to the module 100e in one direction, and Raman pump power 206f is transported away from the module 100e toward the module 100f in the opposite direction. The Raman pump power 206f is used to create Raman amplification in at least part of the optical fiber 202f, and the ROPA 402b also amplifies the optical signals 204f in the optical fiber 202f. The optical signals 204e and 204f travel in opposite directions here, making this optical span a bi-directional span.

To support LOS detection in FIG. 4, switches 122e-122f of the modules 100e-100f are set to the "backward" position. In this configuration, the signal source 118e in the module 100e outputs a low-power optical signal 208e through the switch 122e and through the port 106e of the module 100e onto the optical fiber 202e. Absent a loss of signal condition, the low-power optical signal 208e will travel over the optical fiber 202e to the port 102f and the signal detector 120f of the module 100f. This allows the module 100f or components coupled to the module 100f to identify a loss of signal condition involving the optical fiber 202e by detecting a failure to receive the low-power optical signal 208e. Similarly, the signal source 118f in the module 100f outputs a low-power optical signal 208f through the switch 122f and through the port 106f of the module 100f onto the optical fiber 202f. Absent a loss of signal condition, the low-power optical signal 208f will travel over the optical fiber 202f to the port 102e and the signal detector 120e of the module 100e. This allows the module 100e or components coupled to the module 100e to identify a loss of signal condition involving the optical fiber 202f by detecting a failure to receive the low-power optical signal 208f.

The ROPAs 402a-402b often contain isolators that absorb or block backward Raman pump power 206e-206f while allowing optical signals 204e-204f and low-power optical signals 208e-208f to pass. The ROPAs 402a-402b are typically powered using pumps that are remote from the ROPAs 402a-402b. When the ROPAs 402a-402b are un-pumped (unpowered), the ROPAs 402a-402b can be very lossy at wavelengths under a certain threshold, such as when the ROPAs 402a-402b provide a loss of about 40 dB at about 1550 nm. At longer wavelengths (such as about 1612 nm), the loss of the ROPAs 402a-402b can be much smaller (such as about 3 dB). Thus, the signal sources 118e-118f could operate at one or more longer wavelengths in order to help ensure that the low-power optical signals 208e-208f can pass through un-pumped ROPAs 402a-402b.

As can be seen here, the modules 100a-100f support loss of signal detection over optical fibers and can initiate suitable action in response to an LOS condition. The modules 100a-100f are able to accomplish this using a detection threshold (such as >1 dB) to avoid detecting LOS conditions based on noise or normal power fluctuations. The modules 100a-100f are also able to accomplish this in systems where there are large amounts of ASE or backscatter. Further, the modules 100a-100f are able to detect LOS conditions without significantly affecting the amount of data traffic sent over the optical fibers. In addition, since LOS detection could occur within the modules 100a-100f themselves, there is little if any delay associated with the LOS detection (compared to approaches in which LOS detection occurs outside of a node containing lasers to be shut down).

Although FIGS. 2 through 4 illustrate example uses of modules having integrated signal loss detectors, various changes may be made to FIGS. 2 through 4. For example, a system could include any number of optical spans and associated modules, and at least some of the modules can include integrated signal loss detectors. Also, the uses shown in FIGS. 2 through 4 are examples only, and modules having integrated signal loss detectors could be used in any other suitable manner.

Figure 5:
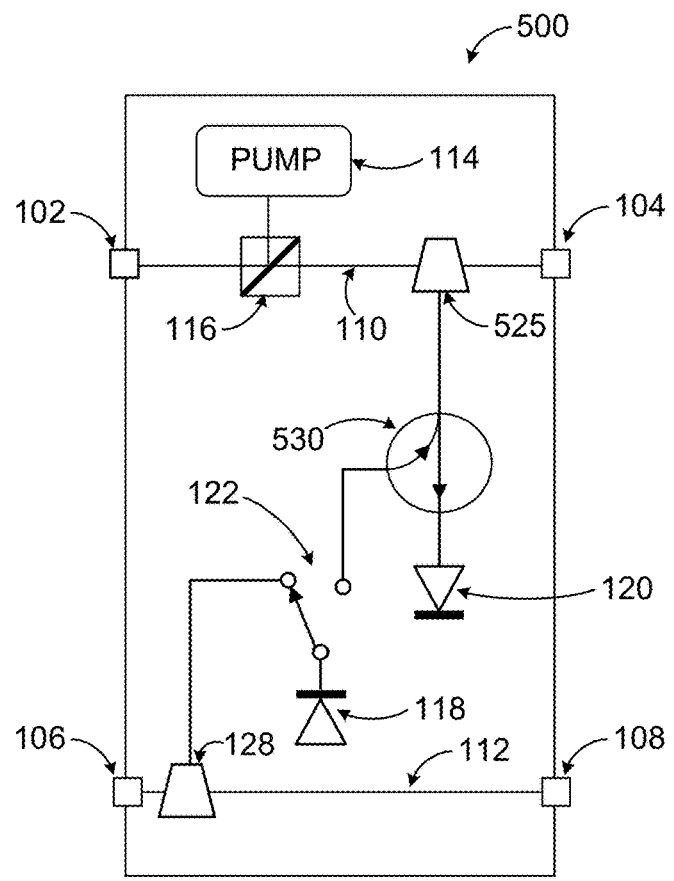
FIG. 5 illustrates a second example of a module having an integrated signal loss detector according to this disclosure.

FIG. 5 illustrates a second example of a module 500 having an integrated signal loss detector according to this disclosure. For ease of explanation, many of the components in the module 500 of FIG. 5 use the same reference numerals as the components in the module 100 of FIG. 1. Only differing components in FIG. 5 are discussed below.

As can be seen in FIG. 5, the filters 124-126 have been replaced by a single filter 525. The filter 525 can perform the functions of both filters 124-126 and can provide only a narrow band of wavelengths between the signal source 118/signal detector 120 and the signal line 110. Also, as can be seen in FIG. 5, the coupler 130 has been replaced with a circulator 530. The circulator 530 generally includes at least three ports and operates by allowing optical signals entering through one port of the circulator 530 to exit through the next port of the circulator 530. In the configuration in FIG. 5, optical signals from the filter 525 can enter the circulator 530 through the top port and exit the circulator 530 through the bottom port. Also, optical signals from the signal source 118 can enter the circulator 530 through the left port and exit the circulator 530 through the top port.

Other than these differences, the remainder of the functionality of the module 500 can be the same as or similar to the functionality of the module 100. The signal source 118 of a first module 500 can generate a low-power optical signal that is routed to a second module 500. The signal detector 120 of the first module 500 can also or alternatively receive a low-power optical signal from the second module 500. One or both modules 500 can thereby engage in LOS detection. The module 500 of FIG. 5 can find use in a number of environments, including any of the use environments shown in FIGS. 2 through 4 described above.

Although FIG. 5 illustrates a second example of a module 500 having an integrated signal loss detector, various changes may be made to FIG. 5. For example, the module 500 shown in FIG. 5 has been simplified for ease of explanation and understanding. Also, while the use of the pump 114 and multiplexer 116 are shown here and described as supporting Raman amplification, other embodiments of the module 500 need not include components supporting Raman amplification.

Figure 6:
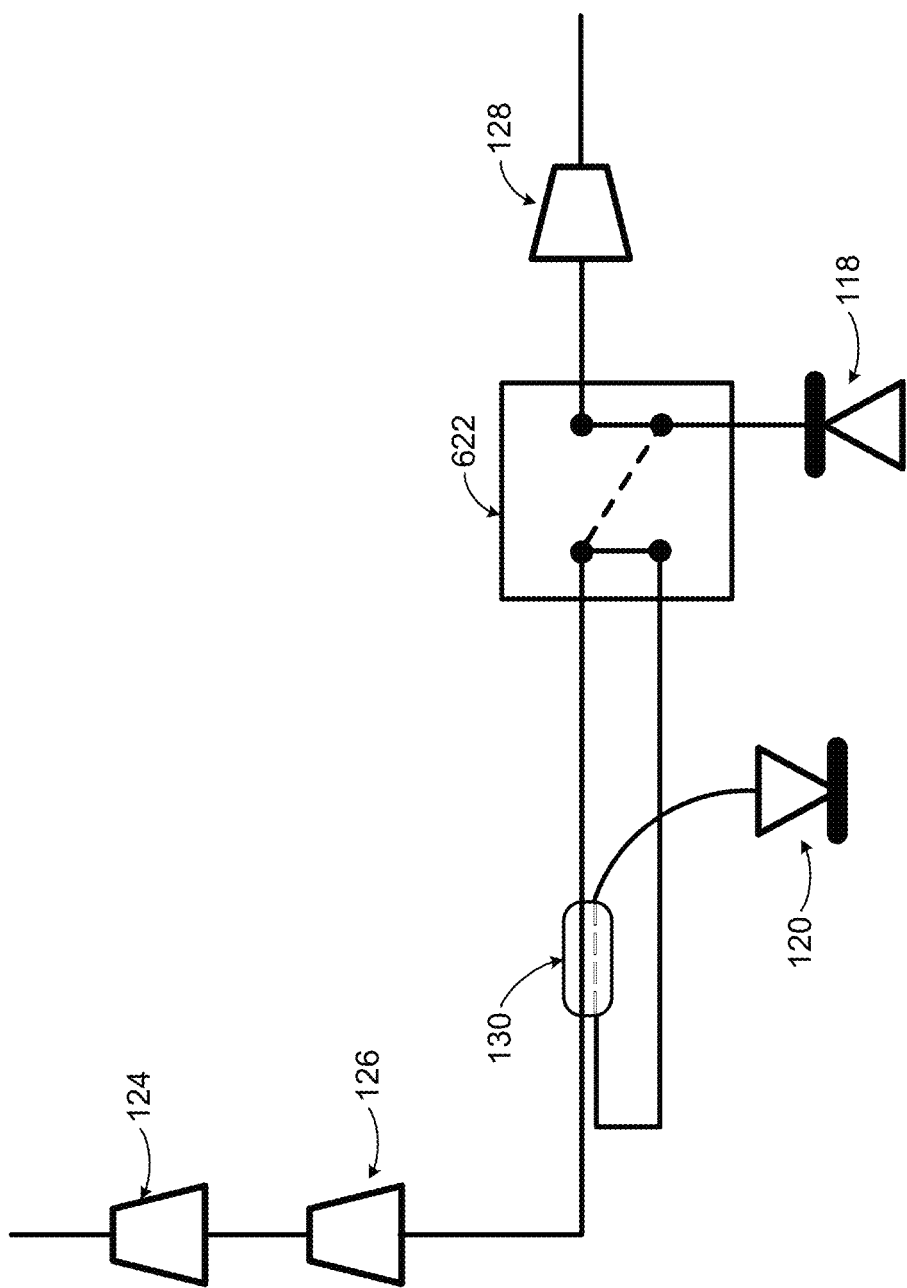
FIG. 6 illustrates a third example of a module having an integrated signal loss detector according to this disclosure.

FIG. 6 illustrates a third example of a module 600 having an integrated signal loss detector according to this disclosure. Again, for ease of explanation, many of the components in the module 600 of FIG. 6 use the same reference numerals as the components in the modules 100 and 500 of FIGS. 1 and 5. Only differing components in FIG. 6 are discussed below. Note that while not shown, all other components of the modules 100 and 500 (except those specifically discussed below) could be used in the module 600.

As can be seen in FIG. 6, the filters 124-126 are being used in the module 600, although as noted above a single filter 525 could be used here. Also, as can be seen in FIG. 6, the 1×2 switch 122 of FIGS. 1 and 5 has been replaced with a 2×2 switch 622. The switch 622 includes two inputs and two outputs. In one configuration represented by solid lines in FIG. 6, the switch 622 connects the signal source 118 to the filter 128, and the switch 622 connects the coupler 130 to another fiber of the coupler 130. In another configuration represented by a dashed line in FIG. 6, the switch 622 connects the signal source 118 to the filters 124-126. The switch 622 therefore still allows the signal source 118 to be coupled to an appropriate port depending on the application. The switch 622 also allows power from the coupler 130 to be recycled into the signal detector 120 when the switch 622 connects the coupler 130 to itself.

Other than these differences, the remainder of the functionality of the module 600 can be the same as or similar to the functionality of the module 100. The signal source 118 of a first module 600 can generate a low-power optical signal that is routed to a second module 600. The signal detector 120 of the first module 600 can also or alternatively receive a low-power optical signal from the second module 600. One or both modules 600 can thereby engage in LOS detection. The module 600 of FIG. 6 can find use in a number of environments, including any of the use environments shown in FIGS. 2 through 4 described above.

Although FIG. 6 illustrates a third example of a module 600 having an integrated signal loss detector, various changes may be made to FIG. 6. For example, the module 600 shown in FIG. 6 has been simplified for ease of explanation and understanding.

Figure 7:
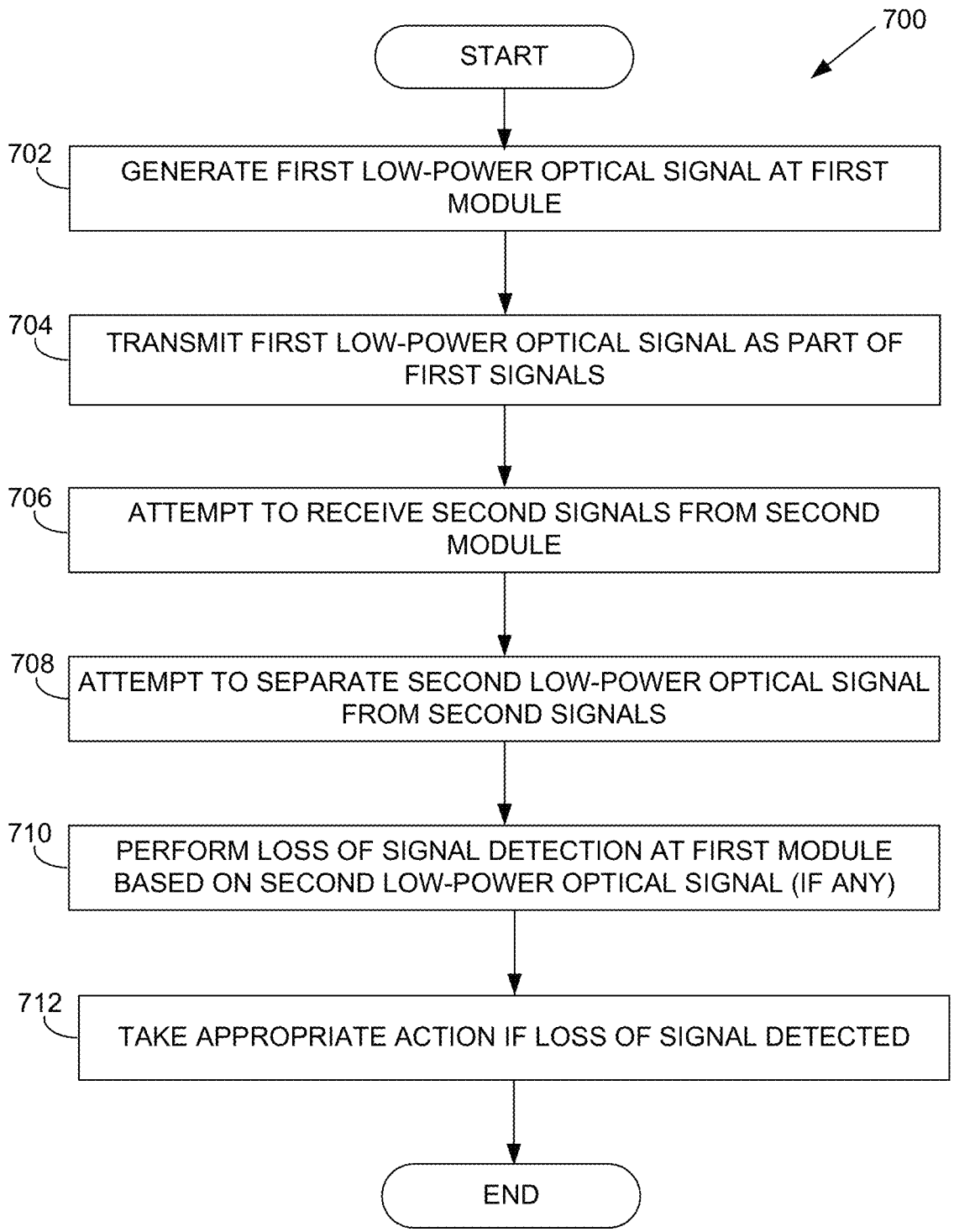
FIG. 7 illustrates an example method for integrated signal loss detection in a Raman amplified fiber span or other fiber span according to this disclosure.

FIG. 7 illustrates an example method 700 for integrated signal loss detection in a Raman amplified fiber span or other fiber span according to this disclosure. For ease of explanation, the method 700 is described as being performed using multiple modules 100 of FIG. 1. However, the same or similar method could be performed using any other suitable modules, such as multiple modules 500 of FIG. 5 or multiple modules 600 of FIG. 6.

As shown in FIG. 7, a first low-power optical signal is generated at a first module at step 702, and the first low-power optical signal is transmitted as part of first optical signals to a second module at step 704. This could include, for example, the signal source 118 of the first module 100 generating a low-power optical signal, such as an optical signal having a −10 dBm power and a wavelength of about 1525 nm or about 1612 nm. The first low-power optical signal could be modulated if desired. This could also include the signal source 118 of the first module 100 providing the first low-power optical signal via the switch 122 of the first module 100 to an appropriate filter or port of the first module 100 for inclusion with optical signals being used for data transport. The first optical signals can be sent to the second module 100 via at least one first optical fiber.

An attempt is made to receive second optical signals at the first module from the second module over a second optical fiber at step 706, and an attempt is made to separate a second low-power optical signal from the second signals at step 708. The term "attempt" is used here since a loss of signal may or may not be occurring. This could include, for example, the filters 124-126 of the first module 100 filtering any incoming optical signals from the second module 100 and outputting any signals in a narrow band of wavelengths. Ideally, if the second low-power optical signal is being received, the second low-power optical signal is provided to the signal detector 120 of the first module 100. This could also include the signal detector 120 of the first module 100 generating one or more outputs based on measurements of its input. The second optical signals can be received from the second module 100 via at least one second optical fiber. Loss of signal detection could therefore occur at the first module at step 710. This could include, for example, a control device 132 using the output of the signal detector 120 to identify when the second low-power optical signal is not being received. Appropriate action can then occur in response to a detected loss of signal at step 712. This could include, for example, the control device 132 initiating automatic laser shutdown (ALS), triggering an alarm, or performing any other or additional actions as needed or desired.

The same process shown in FIG. 7 could occur in the second module 100, except the identities of the first and second modules and the first and second signals would be reversed. Thus, each of the modules could generate a low-power optical signal for the other module and perform LOS detection using a low-power optical signal received from the other module. However, the method 700 shown in FIG. 7 assumes that both modules can engage in LOS detection. Some uses may not require this, such as in the example use shown in FIG. 3. Thus, a module could perform a subset of the steps in FIG. 7, such as only steps 702-704 (like the module 100c) or only steps 706-712 (like the module 100d).

Although FIG. 7 illustrates one example of a method 700 for integrated signal loss detection in a Raman amplified fiber span or other fiber span, various changes may be made to FIG. 7. For example, while shown as a series of steps, various steps in FIG. 7 could overlap, occur in parallel, occur in a different order, or occur any number of times. Also, as noted above, a module could perform a subset of these steps.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of the invention as defined by the following claims.

What is claimed is:

1. An apparatus comprising:
   multiple ports configured to be coupled to multiple optical fibers and to transmit first optical signals and receive second optical signals over the optical fibers;
   a signal source configured to generate a first additional optical signal for inclusion with the first optical signals;
   a signal detector configured to detect a second additional optical signal included with the second optical signals;
   at least one pump configured to generate Raman pump power;
   at least one multiplexer configured to inject the Raman pump power onto at least one of the optical fibers; and
   a switch configured to selectively couple the signal source to one of the ports, the switch configured to couple the signal source to different ones of the ports in different configurations of the switch, the different configurations of the switch based on whether the Raman pump power is used for forward or backward Raman amplification.

2. The apparatus of claim 1, wherein the switch comprises a 1×2 switch.

3. The apparatus of claim 1, further comprising:
   a first filter coupled to a first of the ports, a second of the ports, the signal detector, and the switch; and
   a second filter coupled to a third of the ports, a fourth of the ports, and the switch;
   wherein each filter is configured to filter the first or second optical signals and to output a specified range of wavelengths, the specified range of wavelengths including a wavelength of the first or second additional optical signal.

4. The apparatus of claim 3, further comprising:
   an optical coupler configured to couple the signal source and the signal detector to the first filter.

5. The apparatus of claim 4, wherein the switch comprises a 2×2 switch that, in one configuration, is configured to recycle power from the optical coupler into the signal detector.

6. The apparatus of claim 1, wherein the first and second additional optical signals are outside a signal band of wavelengths used by the first and second optical signals.

7. The apparatus of claim 1, wherein the first and second additional optical signals are modulated.

8. A system comprising:
   an optical span including a first module configured to communicate optically with a second module, the first module comprising:
   multiple ports configured to be coupled to multiple optical fibers, at least one of the ports configured to at least one of: transmit first optical signals to the second module and receive second optical signals from the second module;
   a signal source configured to generate a first additional optical signal for inclusion with the first optical signals;
   a signal detector configured to detect a second additional optical signal included with the second optical signals;
   at least one pump configured to generate Raman pump power;
   at least one multiplexer configured to inject the Raman pump power onto at least one of the optical fibers; and
   a switch configured to selectively couple the signal source to one of the ports, the switch configured to couple the signal source to different ones of the ports in different configurations of the switch, the different configurations of the switch based on whether the Raman pump power is used for forward or backward Raman amplification.

9. The system of claim 8, wherein the switch comprises a 1×2 switch.

10. The system of claim 8, wherein the first module further comprises:
    a first filter coupled to a first of the ports, a second of the ports, the signal detector, and the switch; and
    a second filter coupled to a third of the ports, a fourth of the ports, and the switch;
    wherein each filter is configured to filter the first or second optical signals and to output a specified range of wavelengths, the specified range of wavelengths including a wavelength of the first or second additional optical signal.

11. The system of claim 10, wherein the first module further comprises:
    an optical coupler configured to couple the signal source and the signal detector to the first filter.

12. The system of claim 11, wherein the switch comprises a 2×2 switch that, in one configuration, is configured to recycle power from the optical coupler into the signal detector.

13. An apparatus comprising:
    first, second, third, and fourth ports configured to be coupled to multiple optical fibers;
    a first signal line communicatively coupling the first and second ports;
    a second signal line communicatively coupling the third and fourth ports;
    a signal source configured to generate a first loss of signal (LOS) optical signal for transmission through the third port;
    a signal detector configured to detect a second LOS optical signal received through the first port;
    at least one pump configured to generate Raman pump power;
    at least one multiplexer configured to inject the Raman pump power through at least one of the ports; and
    a switch configured to selectively couple the signal source to the first port or the third port, the switch configured to couple the signal source to different ones of the ports in different configurations of the switch, the different configurations of the switch based on whether the Raman pump power is used for forward or backward Raman amplification.

14. The apparatus of claim 13, further comprising:
    a first filter coupled to the first signal line, the signal detector, and the switch; and
    a second filter coupled to the second signal line and the switch;
    wherein each filter is configured to filter optical signals and to output a specified range of wavelengths, the specified range of wavelengths including a wavelength of the first or second LOS optical signal.

15. The apparatus of claim 14, further comprising:
    an optical coupler or circulator configured to couple the signal source and the signal detector to the first filter.

16. The apparatus of claim 15, wherein the switch comprises a 2×2 switch that, in one configuration, is configured to recycle power from the optical coupler into the signal detector.

17. The apparatus of claim 16, wherein the 2×2 switch is further configured, in another configuration, to couple the signal source to the optical coupler.

18. The apparatus of claim 3, further comprising:
a circulator configured to couple the signal source and the signal detector to the first filter.

19. The system of claim 10, wherein the first module further comprises:
a circulator configured to couple the signal source and the signal detector to the first filter.

20. The apparatus of claim 14, further comprising:
a circulator configured to couple the signal source and the signal detector to the first filter.

* * * * *